US011371425B2

(12) United States Patent
Pritchard, Jr. et al.

(10) Patent No.: US 11,371,425 B2
(45) Date of Patent: Jun. 28, 2022

(54) SYSTEM AND METHOD FOR CLEANING DEPOSIT FROM A COMPONENT OF AN ASSEMBLED, ON-WING GAS TURBINE ENGINE

(71) Applicant: General Electric Company, Schenectady, NY (US)

(72) Inventors: Byron Andrew Pritchard, Jr., Loveland, OH (US); Erica Elizabeth Sampson, Clifton Park, NY (US); William Francis Navojosky, Ballston Spa, NY (US); Keith Anthony Lauria, Wells, NY (US); Nicole Jessica Tibbetts, Delanson, NY (US); Ambarish Jayant Kulkarni, Glenville, NY (US); Bernard Patrick Bewlay, Niskayuna, NY (US); Michael Robert Millhaem, Cincinnati, OH (US); Gongguan Wang, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/027,754

(22) Filed: Sep. 22, 2020

(65) Prior Publication Data

US 2022/0090537 A1 Mar. 24, 2022

(51) Int. Cl.

| | |
|---|---|
| ***F02B 77/04*** | (2006.01) |
| ***B64F 5/30*** | (2017.01) |
| ***B08B 3/08*** | (2006.01) |
| ***B08B 3/10*** | (2006.01) |

(52) U.S. Cl.
CPC ................ *F02B 77/04* (2013.01); *B08B 3/08* (2013.01); *B08B 3/10* (2013.01); *B64F 5/30* (2017.01)

(58) Field of Classification Search
None
See application file for complete search history.

(56) References Cited

U.S. PATENT DOCUMENTS

| | | | |
|---|---|---|---|
| 5,938,855 | A | 8/1999 | Bowden, Jr. |
| 6,553,768 | B1 | 4/2003 | Trewin et al. |
| 6,663,718 | B1 | 12/2003 | Mush |
| 6,977,015 | B2 | 12/2005 | Hardwicke et al. |
| 7,033,979 | B2 | 4/2006 | Herwig et al. |

(Continued)

FOREIGN PATENT DOCUMENTS

| | | |
|---|---|---|
| DE | 102013202616 B4 | 10/2015 |
| DE | 102014206084 | 10/2015 |

(Continued)

*Primary Examiner* — Eric W Golightly
(74) *Attorney, Agent, or Firm* — Fitch, Even, Tabin & Flanerry LLP

(57) ABSTRACT

Systems and methods for cleaning deposits from a component of an assembled, on-wing gas turbine engine are provided. Accordingly, the method includes operably coupling a delivery assembly to an annular inlet of a core gas turbine engine. A portion of cleaning fluid is atomized with the delivery assembly to develop a cleaning mist having a plurality of atomized droplets. The atomized droplets are suspended within any path of the core gas turbine engine from the annular inlet to an axial position downstream of a compressor of the core gas turbine engine. A portion of the cleaning mist is impacted or precipitated onto the component so as to wet the component, and a portion of the deposits on the component is dissolved by the cleaning mist.

19 Claims, 6 Drawing Sheets

(56) References Cited

U.S. PATENT DOCUMENTS

| | | | |
|---|---|---|---|
| 7,445,677 B1 | 11/2008 | Asplund | |
| 7,815,743 B2 | 10/2010 | Asplund et al. | |
| 8,028,936 B2 | 10/2011 | McDermott | |
| 8,277,647 B2 | 10/2012 | Rice et al. | |
| 9,138,782 B2 | 9/2015 | Dorshimer et al. | |
| 9,657,589 B2 | 5/2017 | Hjerpe | |
| 9,739,168 B2 | 8/2017 | Ekanayake et al. | |
| 10,634,004 B2 | 4/2020 | Giljohann et al. | |
| 10,669,885 B2 | 6/2020 | Pecchiol et al. | |
| 10,731,508 B2 | 8/2020 | Tibbetts | |
| 10,920,181 B2 | 2/2021 | Martin et al. | |
| 2009/0211601 A1 | 8/2009 | Hauzer | |
| 2017/0165721 A1 | 6/2017 | Tibbetts et al. | |
| 2021/0108537 A1 | 4/2021 | Rigg et al. | |
| 2021/0317752 A1 | 10/2021 | Deja et al. | |

FOREIGN PATENT DOCUMENTS

| | | |
|---|---|---|
| DE | 102015006330 B4 | 8/2019 |
| WO | 2020022474 A1 | 1/2020 |
| WO | 2020030516 A1 | 2/2020 |

SYSTEM AND METHOD FOR CLEANING DEPOSIT FROM A COMPONENT OF AN ASSEMBLED, ON-WING GAS TURBINE ENGINE

FIELD

The present subject matter relates generally to gas turbine engines, and more particularly, to systems and methods for cleaning deposits from components of gas turbine engines.

BACKGROUND

A typical aircraft-mounted gas turbine engine includes gas turbine engine components having very fine cooling passages that allow for higher gas temperatures in the combustor and/or the high-pressure or low-pressure turbines. During operation, particularly in environments that contain fine-scale dust, environmental particulate accumulates on engine components and within the cooling passages of the engine. For example, dust (reacted or non-reacted), sand, or similar, can build up on the flow path components and on the impingement cooled surfaces during turbine engine operation. In addition, particulate matter entrained in the air that enters the turbine engine and the cooling passages can contain sulfur-containing species that can corrode the components. Such deposits can lead to reduced cooling effectiveness of the components and/or corrosive reaction with the metals and/or coatings of the engine components. Thus, deposits can lead to premature distress and/or reduced engine life. Additionally, accumulations of environmental contaminants (e.g. dust-reacted and unreacted, sand, etc.) can degrade aerodynamic performance of the high-pressure components and lower fuel efficiency of the engine through changes in airfoil morphology. For example, cleaning the blades and vanes of the compressor may improve the efficiency of compression and result in a lower exit temperature for the compressor. This, in turn, may result in a lower operating temperature of the hot section of the engine, which may increase the operating life of the various components.

Accordingly, an improved method to clean gas turbine engine components would be useful.

BRIEF DESCRIPTION

Aspects and advantages of the invention will be set forth in part in the following description, or may be obvious from the description, or may be learned through practice of the invention.

In one aspect, the present disclosure is directed to a method for removing a deposit from at least one component of an assembled, on-wing gas turbine engine. The gas turbine engine may include a core gas turbine engine positioned downstream of a fan section. The core gas turbine engine may have an absence of powered rotation during the removal of the deposit. The method may include operably coupling a delivery assembly to an annular inlet of the core gas turbine engine. The delivery assembly may be coupled to a control unit and a storage vessel containing a cleaning fluid. The method may also include atomizing a portion of the cleaning fluid with the delivery assembly to develop a cleaning mist. The cleaning mist may include a plurality of atomized droplets. The method may include suspending the atomized droplets of the cleaning mist within an airflow within at least one flow path of the core gas turbine engine. The cleaning mist may occupy a cross-sectional area of the at least one flow path to establish a simultaneous cross-sectional contact therein. At least a portion of the atomized droplets may remain suspended within the flow path(s) from the annular inlet to an axial position downstream of a high-pressure compressor of the gas turbine engine. Additionally, the method may include impacting or precipitating a portion of the cleaning mist onto the component(s) so as to wet at least 80% of an exposed, inlet-facing surface of the component(s). Further, the method may include dissolving at least a portion of the deposit on the component(s).

In an embodiment, the atomized droplets may have a median diameter of less than or equal to 50 microns and the cleaning mist has a fluid-to-air mass ratio of at least 0.05 and less than or equal to 5.0 kilograms of cleaning fluid to kilograms of air.

In an additional embodiment, a thermal state of the core gas turbine engine may be less than or equal to 135% of an ambient air temperature and the axial position downstream of the compressor may be an axial position downstream of the on-wing gas turbine engine.

In a further embodiment, the method may include establishing an elevated delivery temperature of the cleaning mist which increases the vapor content of the cleaning mist within the flow path(s).

In an embodiment, the method may include supplying a surge portion of the cleaning mist to the core gas turbine engine. The method may also include operably decoupling the delivery assembly from the annular inlet. Further, the method may include establishing a soak period during which the cleaning fluid affects the deposit.

In an additional embodiment, the delivery assembly may include an array of nozzles. Each nozzle of the array of nozzles may be configured to develop atomized droplets having a median diameter of less than or equal to 50 microns. The method may also include actuating at least one nozzle of the array of nozzles to establish a cleaning mist volume. The cleaning mist volume may include a concentration of atomized droplets within a specified portion of the flow path(s). The cleaning mist volume may be characterized by a fluid-to-air mass ratio of at least 0.05 and less than or equal to 5.0 kilograms of cleaning fluid to kilograms of air In a further embodiment, the method may include obtaining environmental data. The environmental data may include an ambient temperature, an ambient pressure, and an ambient humidity affecting the on-wing gas turbine engine. The method may also include obtaining data indicative of a thermal state of the core gas turbine engine. Based on the environmental data and the data indicative of the thermal state of the core gas turbine engine, the method may include establishing the cleaning mist volume delivered to the annular inlet. Establishing the cleaning mist volume may also include establishing a cleaning mist flow rate within the flow path(s).

In an embodiment, the method may include monitoring an absolute humidity level at a point-of-departure from the on-wing gas turbine engine. The method may also include utilizing the monitored humidity level to determine a percentage of the delivered cleaning mist remaining suspended at the point-of-departure from the on-wing gas turbine engine. Additionally, the method may include adjusting the cleaning mist volume delivered to the annular inlet based on the determined percentage so as to achieve a desired level of wetting of the component(s).

In an additional embodiment, the method may include determining a first volume of cleaning fluid atomized and delivered as the cleaning mist to the annular inlet. The method may also include determining a second volume of cleaning fluid suspended at the point-of-departure from the on-wing gas turbine engine based on the monitored humidity level. Additionally, the method may include computing the portion of the first volume of cleaning fluid precipitated onto the component(s) based on a difference between the first and second volumes. Further, the method may include adjusting the cleaning mist volume delivered to the annular inlet so that the second volume is less than or equal to 35% of the first volume.

In a further embodiment, the delivery assembly may include an array of nozzles. Additionally, operably coupling the delivery assembly to the annular inlet may also include positioning the array of nozzles within the fan section so that an outlet of each nozzle of the array of nozzles is arranged at an axial location between the fan section and the annular inlet of the core gas turbine engine. Additionally, the method may include circumscribing the array of nozzles with at least one blocking element. The blocking element(s) may at least partially occlude an alternative flow path.

In an embodiment, removing the deposit from the component(s) of the on-wing gas turbine engine may be repeated at least once every 30 days.

In an additional embodiment, the method may include establishing a cleaning cycle. The cleaning cycle may have a duration of 30 minutes or less. The method may also include operably decoupling the delivery assembly from the annular inlet by a conclusion of the cleaning cycle.

In a further embodiment, atomizing a portion of the cleaning fluid may include atomizing less than 120 liters of cleaning fluid.

In an additional aspect, the present disclosure is directed to a system for cleaning deposits from at least one component of an assembled, on-wing gas turbine engine. The on-wing gas turbine engine may include a core gas turbine engine positioned downstream of a fan section. The on-wing gas turbine engine may have an absence of powered rotation during the removal of deposits. The system may include a storage vessel containing a cleaning fluid. The system may also include a delivery assembly operably coupled to the storage vessel and a control unit. The delivery assembly may include at least one nozzle. The nozzle may be configured to atomized a portion of the cleaning fluid to develop a cleaning mist. The cleaning mist may include a plurality of atomized droplets. The atomized droplets may have a median diameter facilitating suspension of the atomized droplets within the flow path(s) of the core gas turbine engine from an annular inlet of the core gas turbine engine to an axial position downstream of a high-pressure compressor of the core gas turbine engine. The cleaning mist may occupy a cross-sectional area of the flow path(s) to establish a simultaneous cross-sectional contact therein. Additionally, the system may include a flow generation assembly. The flow generation assembly may be oriented to facilitate a passage of the cleaning mist along the flow path(s) of the core gas turbine engine. It should be appreciated that the system may further include any of the features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
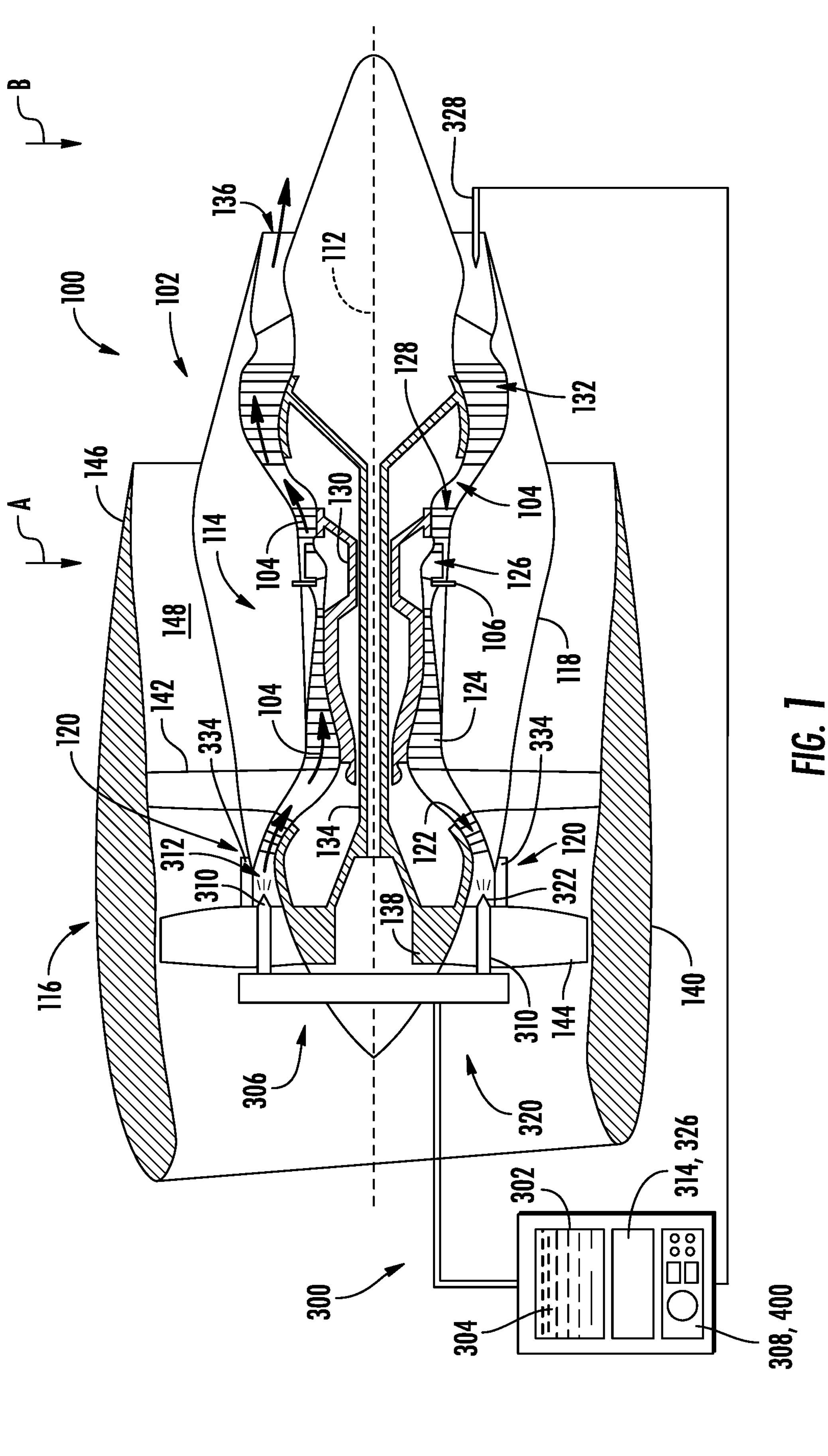
FIG. 1 shows a schematic cross-sectional view of one embodiment of a gas turbine engine and a system for cleaning deposits from a component of the gas turbine engine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first" and "second" may be used interchangeably to distinguish one component(s) from another and are not intended to signify location or importance of the individual component(s)s.

As used herein, the term "vapor" refers to a substance in the gaseous state, as distinguished from the liquid or solid state.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, the fluid flow is in the direction encountered by the gas turbine engine in flight operations.

As used herein, the phrases "constructed of CMCs" and "comprised of CMCs" shall mean component(s)s substantially constructed of CMCs. More specifically, the CMC component(s)s shall include more CMC material than just a layer or coating of CMC materials. For example, the component(s)s constructed of CMCs may be comprised or constructed substantially or entirely of CMC materials, including greater than about 50, 60, 70, 80, 90, or 100 percent CMC material.

Certain approaches for treating assembled engines may rely on foam or liquids. However, the physical characteristics of the treating medium may impose limits on the engine surfaces which may be affected. Additionally, certain approaches to cleaning engines on-wing may require the aircraft to be positioned in a maintenance area of an airfield and taken out of service for an undesirable length of time. For example, certain approaches may require that the aircraft be taken out of service for 4-9 hours and may require the disassembly of a portion of the engine, the presence of a crew in a cockpit, and/or an external power source to rotate the engine. As a result of these drawbacks, it may not be practical for these cleaning approaches to be practiced more than 2-4 times per year. The extended intervals between cleanings may result in the engine being operated in a fouled condition for a greater percentage of the time.

One or more of the above-identified issues may be addressed by the presently disclosed methods and systems. In particular, methods and systems are generally provided for cleaning/removing deposits from components of an assembled, on-wing gas turbine engine. The methods of the present disclosure generally provide for introducing a cleaning mist into the annular inlet of the engine. The cleaning mist may include atomized particles of a cleaning fluid which are sized to permit the cleaning mist to remain suspended in a flow path of the core engine at least to a location downstream of a high-pressure compressor. As the cleaning mist flows along the flow path, the atomized particles may encounter various components of the engine. When encountering the various components, the atomized particles may impact the component and/or precipitate onto the component thereby wetting the component with the cleaning fluid. By utilizing the cleaning mist, the methods described herein may be accomplished in 30 minutes or less without requiring the disassembly or rotation of the engine. Additionally, the utilization of the cleaning mist to wet the components facilitates an efficient cleaning cycle utilizing less than 120 liters cleaning fluid.

Referring now to the drawings, FIG. 1 illustrates a cross-sectional view of one embodiment of an assembled, on-wing gas turbine engine 100 that may be utilized with an aircraft in accordance with aspects of the present subject matter, the engine 100 is shown having a longitudinal or axial centerline axis 112 extending therethrough for reference purposes. In an embodiment, the engine 100 may include at least one component 102 configured to affect a portion of ambient air entering the engine 100. The component(s) 102 may include any of the elements of the engine 100 discussed herein. In an embodiment, the component(s) 102 may, for example, be formed from CMC, titanium, steel, aluminum, nickel, chromium and/or combinations thereof. Additionally, it should be appreciated that while the engine 100 is depicted in FIG. 1 as a turbofan jet engine, the systems and methods described herein may be employed on any turbomachine including, but not limited to, high-bypass turbofan engines, low-bypass turbofan engines, turbojet engines, turboprop engines, turboshaft engines, propfan engines, and so forth.

In general, the engine 100 may include a core gas turbine engine (indicated generally by reference character 114) and a fan section 116 positioned upstream thereof. The core engine 114 may generally include a substantially tubular outer casing 118 that defines an annular inlet 120. The annular inlet 120 may define an entrance to at least one flow path 104 of the core engine 114

In an embodiment, the outer casing 118 may enclose and support a booster compressor 122 for increasing the pressure of the air that enters the core engine 114 to a first pressure level. A high-pressure (HP), multi-stage, axial-flow compressor 124 may be serially arranged at an axial position downstream of the booster compressor 122. In operation, the HP compressor 124 may receive the pressurized air from the booster compressor 122 and further increase the pressure of such air.

In an embodiment, a combustor 126 may be serially arranged at an axial position downstream of the HP compressor 124. In operation, pressurized air exiting the HP compressor 124 may flow to the combustor 126 within which fuel may be injected by a fuel system 106 into the flow of pressurized air, with the resulting mixture being combusted within the combustor 126.

Referring still to FIG. 1, in an embodiment, an HP turbine 128 may be serially arranged at an axial position downstream of the combustor 126 so that high energy combustion products may be directed from the combustor 126 along the flow path(s) 104 of the engine 100 to the HP turbine 128 for driving the HP compressor 124 via an HP driveshaft the 130.

In an embodiment, a low-pressure (LP) turbine 132 may be serially arranged at an axial position downstream of the HP turbine 128. The LP turbine 132 may be configured for driving the booster compressor 122 and the fan section 116 via an LP driveshaft 134. In an embodiment, the LP driveshaft 134 may be generally coaxial with HP driveshaft 130.

As depicted in FIG. 1, the flow path(s) 104 may communicatively couple the annular inlet 120 with a point-of-departure 136 from the engine 100. For example, in operation, after driving the HP turbine 128 and the LP turbine 132, the combustion products in the flow path(s) 104 may be expelled from the core engine 114 via the point-of-departure 136 configured as an exhaust nozzle to provide propulsive jet thrust.

It should be appreciated that each turbine may generally include one or more turbine stages, with each stage including a turbine nozzle and a downstream turbine rotor. As will be described below, the turbine nozzle may include a plurality of vanes disposed in an annular array about the centerline axis 112 of the engine 100 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's driveshafts 130, 134.

Additionally, as shown in FIG. 1, the fan section 116 of the engine 100 may generally include a rotatable, axial-flow fan rotor 138 surrounded by an annular fan casing 140. In an embodiment, the LP driveshaft 134 may be operably coupled to the fan rotor 138. It should be appreciated that the fan casing 140 may be supported relative to the core engine 114 by a plurality of substantially radially-extending, circumferentially-spaced outlet guide vanes 142. As such, the fan casing 140 may enclose the fan rotor 138 and its corresponding fan rotor blades 144. Moreover, a downstream section 146 of the fan casing 140 may extend over an outer portion of the core engine 114 to define at least one alternative flow path 148 between the fan casing 140 and the outer casing 118 of the core engine 114. In an embodiment, the alternative flow path(s) 148 may provide additional propulsive jet thrust.

As shown in FIGS. 1-4, in an embodiment, a system 300 may be utilized to clean deposits from the component(s) 102 of the assembled, on-wing gas turbine engine 100. The system 300 may be employed when the core engine 114 is essentially stationary and not being rotated via the application of a power source. The system 300 may include a storage vessel 302 containing a cleaning fluid 304. The system 300 may also include a delivery assembly 306 operably coupled to the storage vessel 302 and a control unit 308. The delivery assembly 306 may include at least one nozzle 310 configured to atomize a portion of the cleaning fluid 304 in order to develop a cleaning mist 312. The cleaning mist 312 may include a plurality of atomized droplets. The atomized droplets may have a median diameter, and thus mass, which facilitates suspension of the atomized droplets within the flow path(s) 104 of the core engine 114. In an embodiment, a portion of the atomized droplets of the cleaning mist 312 may be suspended within an airflow 318 within the flow path(s) 104 from the annular inlet 120 to an axial position (A) downstream of the HP compressor 124. The cleaning mist 312 may occupy a cross-sectional area of the flow path(s) 104 to establish a simultaneous cross-sectional contact therein. In other words, in an embodiment, the cleaning mist 312 may essentially fill the flow path(s) 104 at a given axial location without requiring that the engine 100 be rotated. The system 300 may also include a flow generation assembly 314 which may be oriented to facilitate a passage of the cleaning mist 312 along the flow path(s) 104 of the core engine 114.

In an embodiment, the cleaning fluid 304 may include any suitable composition now known or later developed in the art. For example, in an embodiment, the cleaning fluid 304 may include a biodegradable citric and/or glycolic-acid composition including both ionic and non-ionic surfactants and/or corrosion inhibition properties. Accordingly, the cleaning fluid 304 may be compatible with all coatings and components 102 internal and external to the engine 100 and suitable for on-wing application. The cleaning fluid 304 may be utilized without requiring a rinse step prior to firing the engine 100 following the cleaning. The cleaning fluid 304 may demonstrate no pitting corrosion or intergranular attack to engine parent metals or coding systems. Accordingly, the cleaning fluid 304 may be a water-based cleaning fluid. For example, in an embodiment, the cleaning fluid 304 may be a water-detergent combination. In a further embodiment, the cleaning fluid 304 may be water without a detergent. Additionally, the water may be treated to remove potential contaminants, such as by distillation and/or deionization.

The cleaning fluid 304 may be configured to affect the component(s) 102 by wetting the component(s) 102. The wetting of the component(s) 102 may, in an embodiment, include the formation of a liquid film that substantially covers an exposed surface of the component(s) 102. For example, the system 300 may be configured to form a liquid film over greater than 75% (e.g., at least 80%) of the exposed, inlet-facing surface of the component(s) 102 (e.g., blades and vanes of the HP compressor 124).

It should be appreciated that the wetting of the component(s) 102 may permit the cleaning fluid 304 to dissolve/de-bond a portion of the deposit on the component(s) 102. The dissolution of a portion of the deposit may weaken a bond between the deposited contamination and the surface of the component(s) 102. In such an embodiment, the weakened bond may permit an additional portion of the deposited contamination to be removed by thermodynamic and/or mechanical forces during a startup of the engine 100.

In an embodiment, the cleaning fluid 304 may be configured to be delivered to the engine 100 at a constant rate. In an additional embodiment, the cleaning fluid 304 may be delivered to the engine 100 at a variable rate. For example, in an embodiment, a first portion of the cleaning fluid 304 may be delivered at the initiation of the cleaning cycle so as to rapidly whet the component(s) 102. The amount of cleaning fluid 304 delivered to the engine may then be reduced and the wetted component(s) 102 may be permitted to soak. During the soak, a desired level of wetness may be maintained via a second portion of the cleaning fluid 304, which may be less than the first portion of the cleaning fluid 304. Following at least one soak. A third portion of the cleaning fluid 304 may be introduced so as to increase the wetness of the component(s) 102. As is more fully described below, the third portion of the cleaning fluid 304 may be considered a surge portion In an embodiment, atomizing a portion of the cleaning fluid 304 with the delivery assembly 306 may develop the cleaning mist 312. The cleaning mist 312 may include a plurality of atomized droplets of the cleaning fluid 304 suspended in a volume of gas, such as a volume of atmospheric air. For example, in an embodiment wherein the cleaning fluid 304 is a water-based cleaning fluid, the development of the cleaning mist 312 may result in a supersaturated vapor component of the cleaning mist 312 having a water content in excess of that naturally occurring under prevailing ambient conditions. In other words, the atomization of the water of the cleaning fluid 304 may result in a portion of the atomized droplets evaporating in the air to which the atomized droplets of the cleaning fluid 304 are introduced, thereby raising the fluid content of the resultant vapor component of the cleaning mist 312. The remaining portion of the atomized cleaning fluid 304 comprising the cleaning mist 312 may remain as water and/or water-detergent droplets which are entrained in a flow of the vapor component. In an embodiment, the cleaning mist 312 may have a fluid-to-air mass ratio of at least 0.05 and less than or equal to 5.0 kilograms of cleaning fluid to kilograms of air. For example, in an embodiment, the fluid-to-air mass ratio may be at least 1.0 and less than 4.0.

It should be appreciated that the effectiveness of the cleaning mist 312 may be increased by heating the cleaning fluid 304, heating the portion of air into which the atomized droplets of the cleaning fluid 304 are introduced, and/or increasing the delivery pressure of the cleaning fluid 304 prior to delivery of the cleaning mist 312 to the annular inlet 120. Such techniques may increase the fluid content of the cleaning mist 312 thereby facilitating the wetting of the component(s) 102. For example, for a water-based cleaning fluid 304, the cleaning fluid 304 may be expelled by the nozzle 310 at a temperature from 95° C. to 260° C. and/or a pressure from 10 kPa to 3,500 kPa. In such an embodiment, the engine 100 to be cleaned may be at a standard atmosphere of 15° C. at 101.325 kPa. Upon delivery to the annular inlet, the cleaning fluid 304 may encounter lower pressure and temperature conditions than the delivery pressure and temperature, such that the treatment compound vaporizes (if not already a vapor). Because the water-based treatment compound has a delivery pressure (partial pressure) from 103 kPa to 3,447 kPa, and the saturation pressure of a water-based compound at 15° C. is about 1.705 kPa, the resultant vapor may be supersaturated. It should be appreciated that the term "supersaturated," as used herein, refers to a vapor of a compound that has a higher partial pressure than the vapor pressure of the compound.

In order to increase the temperature of the cleaning fluid 304 and/or the portion of air into which it is introduced, the system 300 may include at least one heating element 316. The heating element(s) 316 may be positioned in thermal contact with the cleaning mist 312 so as to establish an elevated delivery temperature of the cleaning mist 312 relative to the ambient temperature which increases the vapor content of the cleaning mist 312. For example, in an embodiment, the heating element(s) 316 may be positioned in thermal contact with the cleaning fluid 304 contained within the storage vessel 302. In an additional embodiment, the heating element(s) 316 may be positioned in thermal contact with an airflow 318 generated by the flow generation assembly 314. Positioning the heating element(s) 316 in thermal contact with the airflow 318 may increase the temperature of the portion of air into which the atomized droplets of the cleaning fluid 304 are introduced.

Referring still to FIGS. 1-4, in an embodiment, the atomized droplets of the cleaning mist 312 may have a median diameter, and therefore mass, which facilitates the atomized droplets remaining suspended in a portion of air within the flow path(s) 104. At least a portion of the atomized droplets may be entrained in the airflow 318 through the flow path(s) 104 from the annular inlet 120 to the axial position (A) downstream of the HP compressor 124. It should be appreciated that at various points along the flow path(s) 104, the airflow 318 may experience a deceleration, such as due to a directional change of the airflow 318. As a result of the deceleration, the airflow 318 may lack the necessary energy to retain atomized droplets above a specified mass, as defined by the median diameter. When the energy level of the airflow 318 drops below a given threshold for atomized particles of a given size, the atomized particles may depart the airflow 318 and impact/precipitate within the core engine 114. Further, for atomized particles a ball of a given size, the inertial energy of the particles may result in the atomized particles departing the airflow 318. Accordingly, in order for at least a portion of the atomized droplets to remain suspended within the flow path(s) 104 from the annular inlet 120 to the axial position (A), in an embodiment, the atomized droplets may have a median diameter of less than or equal to 50 microns.

In an additional embodiment, the supportability of the cleaning mist 312 within the flow path(s) 104 may be enhanced by the formation of a cleaning mist 312 having atomized droplets with a median diameter greater than or equal to 5 microns and less than or equal to 15 microns. In other words, in an embodiment wherein the water and/or water-detergent droplets have a median diameter in a range between 5 and 15 microns inclusive, the droplets may be entrained in the flow of the vapor component which through the core engine 114. For example, in an embodiment, a thermal state of the core engine 114 may be less than or equal to 135% of an ambient air temperature in degrees Celsius. In such an embodiment, the median diameter of the atomized droplets may facilitate a portion of the cleaning mist 312 remaining suspended within the airflow 318 to an axial position downstream (B) of the on-wing gas turbine engine 100.

In order to develop droplets having the required median diameter, the delivery assembly 306 may atomize a portion of the cleaning fluid 304. For example, the delivery assembly 306 may utilize the nozzle 310 to develop the cleaning mist 312 having atomized droplets of the desired median diameter. The nozzle 310 may utilize at least one orifice and/or the application of ultrasonic energy via an ultrasonic nozzle to atomize the cleaning fluid 304. For example, the cleaning fluid 304 may be drawn through the orifice(s) via a pressure differential across the orifice(s). Alternatively, the cleaning fluid 304 may be driven through the orifice(s) by the development of a higher pressure within the storage vessel 302 than at the orifice(s). The higher pressure may be developed via a pump, a compressed air source 326, and/or heating. In at least one embodiment, the compressed air source 326 may also be configured as the flow generation assembly 314 to facilitate the passage of the cleaning mist 312 along the flow path(s) 104.

In an additional embodiment, the nozzle 310 may be configured as an ultrasonic transducer. In such an embodiment, the nozzle 310 may be inserted into a portion of the cleaning fluid 304 so as to atomize a portion of the cleaning fluid 304. The resultant atomized portion may be drawn from the cleaning fluid 304 by the flow generation assembly 314 for delivery to the annular inlet 120.

Figure 2:
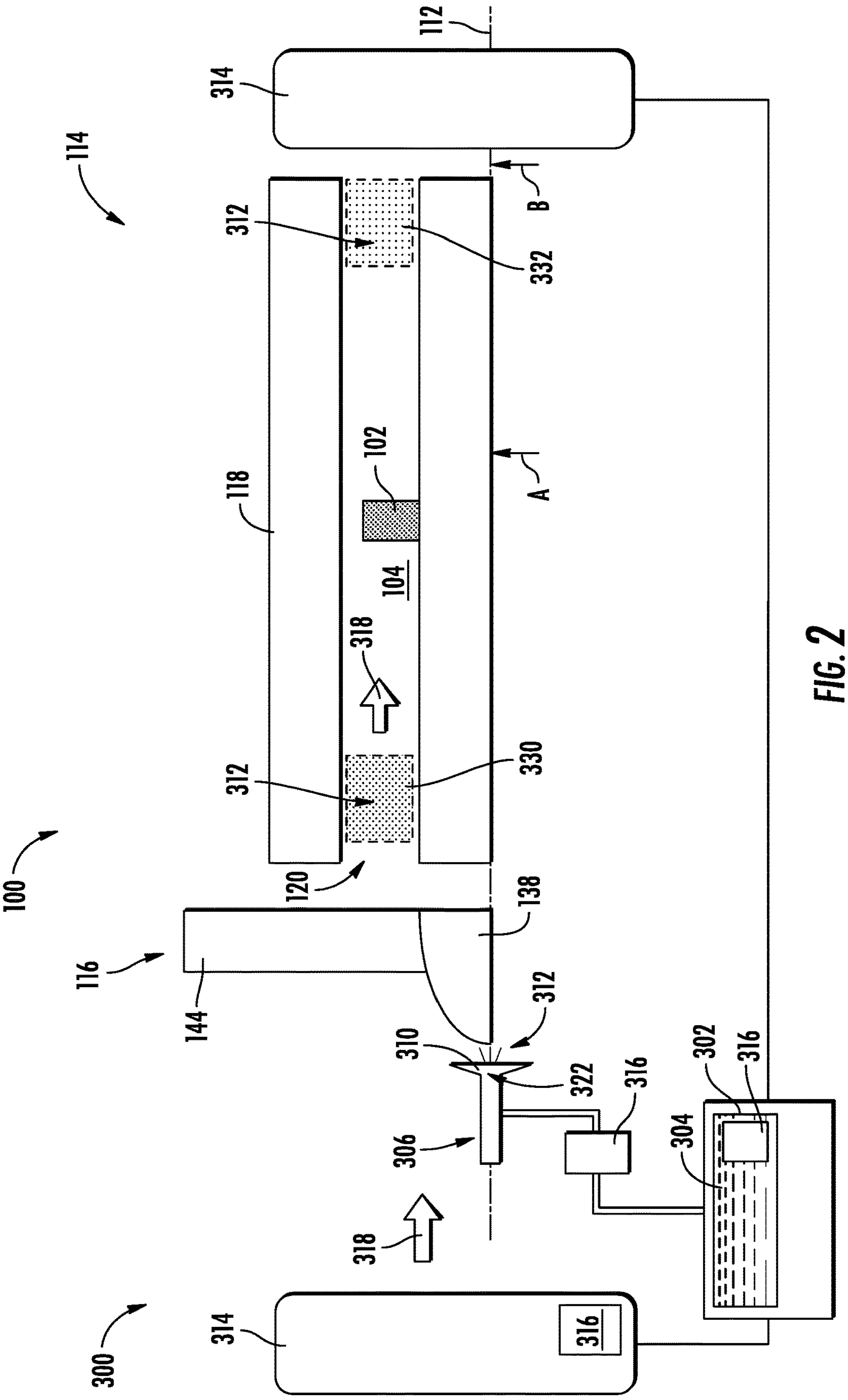
FIG. 2 shows a schematic view of a portion of the gas turbine engine of FIG. 1 and an embodiment of the system for cleaning deposits according to the present disclosure.

As depicted in FIG. 2, the nozzle 310 may be positioned upstream of the fan section 116 and operably coupled to the annular inlet 120 of the core engine 114. In an additional embodiment, the nozzle 310 may be one of an array of nozzles 320. For example, the array of nozzles 320 may include four or more nozzles 310. As depicted in FIG. 1, the array of nozzles 320 may be arranged to interface with the fan section 116 so as to position an outlet 322 of each nozzle 310 at an axial location between the fan section 116 and the annular inlet 120. In such an embodiment, the number of nozzles 310 of the array of nozzles 320 may correspond to the number of spaces between the fan blades 144 such that at least one nozzle 310 is inserted between each pair of fan blades 144. In an embodiment, the nozzles 310 may be operably coupled to the annular inlet 120 without necessitating contact with the engine 100.

In an embodiment wherein the delivery assembly 306 includes the array of nozzles 320, modifying the number nozzles 310 employed to atomize the portion of the cleaning fluid 304 may affect the concentration of atomized droplets within a specified portion 330 of the flow path(s) 104. As such, modifying the number of nozzles 310 may establish a cleaning mist volume. For example, in an embodiment wherein the entire array of nozzles 320 is activated, the concentration of atomized droplets may be greater than in an embodiment wherein the majority of the array of nozzles 320 are idle.

Figure 3:
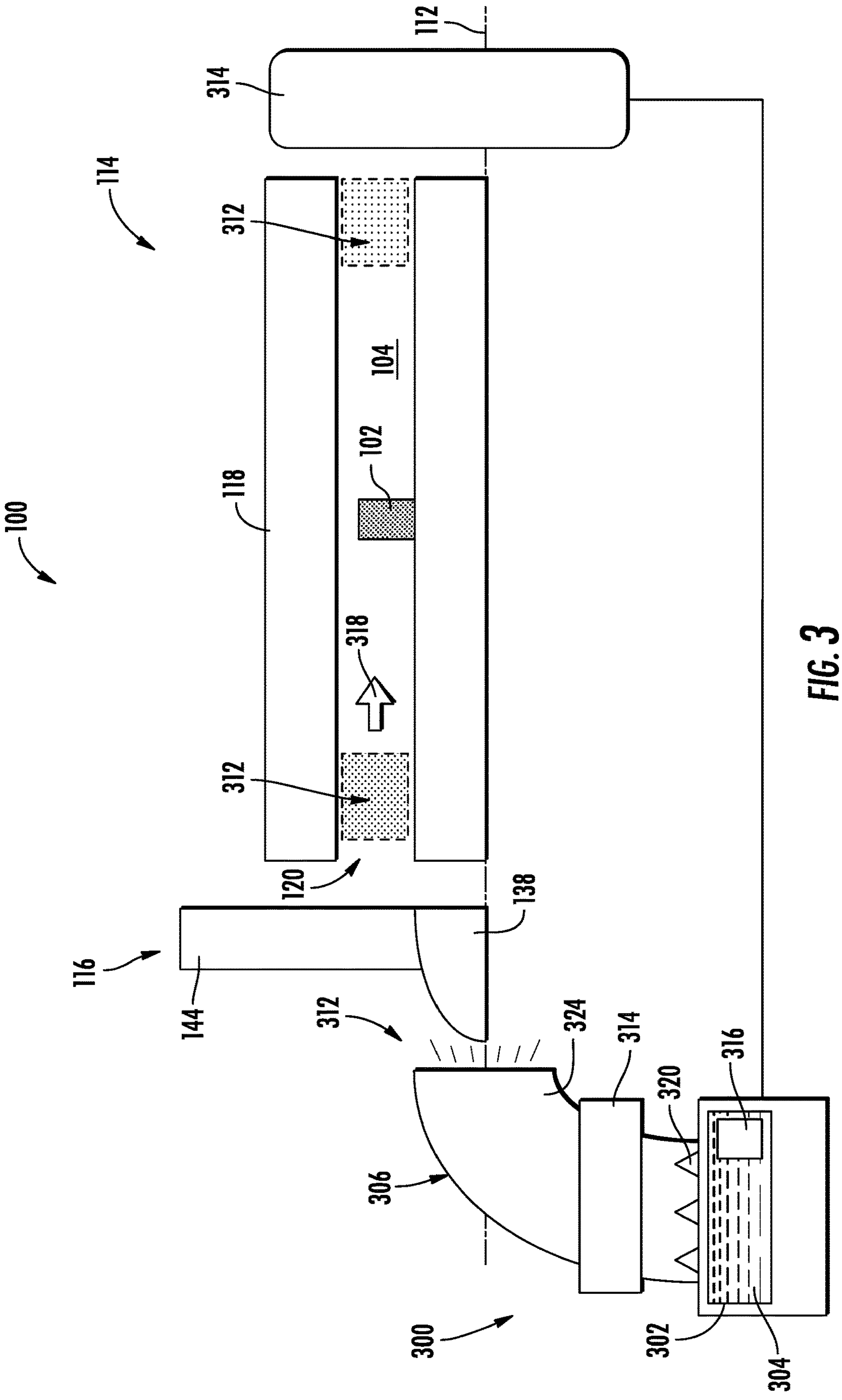
FIG. 3 shows a schematic view of a portion of the gas turbine engine of FIG. 1 and an embodiment of the system for cleaning deposits according to the present disclosure.

Referring now particularly to FIG. 3, in an embodiment, the delivery assembly 306 may include a duct portion 324 communicatively coupled between the core engine 114 and the storage vessel 302. In such an embodiment, the atomization of the cleaning fluid 304 may occur in, or adjacent to, the storage vessel 302. The atomized droplets may enter the duct portion 324 of the delivery assembly 306 and be delivered to the annular inlet 120 by the flow generating assembly 314. In an embodiment, the flow generating assembly 314 may be incorporated into the duct portion 324. Additionally, in an embodiment, duct portion 324 may incorporate the heating element(s) 316.

Referring again to FIGS. 1-3, in an embodiment, the system 300 may include the flow generation assembly 314. The flow generation assembly 314 may facilitate the passage of the cleaning mist 312 along the flow of path 104 by developing the airflow 318. In an embodiment, the flow generation assembly 314 may be configured to drive or draw a portion of atmospheric air so as to generate the airflow 318. In such an embodiment, the flow generation assembly 314 may, for example, be configured as a fan. Accordingly the flow generation assembly may be positioned upstream of the annular inlet 120 when configured to accelerate or drive the airflow 318 and may be positioned downstream of the engine 100 when configured to draw the cleaning mist 312 through the flow path(s) 104.

In an embodiment, the flow generation assembly 314 may be configured to establish a pressure differential between the annular inlet 120 and the point-of-departure 136. For example, in an embodiment, the flow generation assembly 314 may be configured as the compressed air source 326. In such an embodiment, the compressed air may not only drive the cleaning fluid 304 through the nozzle 310, but the venting of the compressed air through the nozzle 310 may create a region of increased pressure in fluid communication with the annular inlet 120. The region of increased pressure may drive the cleaning mist 312 through the flow path(s) 104. In a further embodiment, a high-pressure region may be established adjacent to the annular inlet 120 via the heating of a portion of atmospheric air adjacent to the annular inlet 120. In yet a further embodiment, the flow generation assembly 314 may be positioned downstream of the engine 100 and configured to establish a low-pressure region adjacent to the point-of-departure 136.

Referring still to FIGS. 1-3, in an embodiment, the flow generation assembly 314 of the system 300 may be configured as a heat source positioned downstream of the point-of-departure 136. In such an embodiment, the flow generation assembly 314 may heat the portion of atmospheric air adjacent to the point-of-departure 136. This heating of the atmospheric air may establish the airflow 318 as a convection current through the core engine 114. The cleaning mist 312 may be drawn through the flow path(s) 104 via the convection current.

Referring again to FIG. 1, in an embodiment, the system 300 may include a control unit 308. The control unit 308 may, in an embodiment, include a plurality of controls configured to permit an operator to employ the system 300 to remove a deposit from the component(s) 102 of the assembled, on-wing gas turbine engine 100. In at least one embodiment, the control unit may include various readouts configured to provide the operator with information concerning the cleaning of the engine 100 and various manual controls configured to provide the operator with the necessary degree of control over the methods described herein to remove deposits from the component(s) 102. In an additional embodiment, the control unit 308 may also include a controller 400. The controller 400 may also be configured to implement the methods discussed herein to remove the deposit from the component(s) 102 of the engine 100. It should be appreciated that the controller 400 may be employed in combination with various manual controls and displays to facilitate an operator's control of the methods described herein.

In an embodiment, removing the deposit from the component(s) 102 may include the operator/controller 400 obtaining environmental data indicative of the environmental conditions affecting the on-wing gas turbine engine. For example, the environmental data may include an ambient temperature, an ambient pressure, and an ambient humidity affecting the 100. In an embodiment, the environmental data may also include data indicative of the type of suspended atmospheric particulate (e.g. dust-reacted and unreacted, sand, etc.), an atmospheric particulate concentration, and/or an atmospheric particulate size for an operating environment of the engine 100. In other words, the environmental data may include data on the type and severity of contaminants encountered during the engine's operations. It should be appreciated that the information concerning the encountered particulates may be utilized by the operator/controller 400 to determine a cleaning fluid composition, cleaning operation duration and/or cleaning operation frequency. It should further be appreciated that the environmental data may be obtained from any suitable source, such as a plurality of sensors, an external provider, and/or a lookup table.

The operator/controller 400 may also obtain data indicative of the thermal state of the core engine 114. The thermal state may indicate a difference between the temperature of components within the core engine 114 and the ambient temperature. The data indicative of the thermal state may be obtained via at least one sensor and/or via a lookup table. For example, the thermal state may be determined relative to an elapsed time since engine shutdown under ambient atmospheric conditions. Based on the environmental data and the data indicative of the thermal state, the operator/controller 400 may establish the cleaning mist volume delivered to the annular inlet 120. For example, establishing the cleaning mist volume may include actuating a nozzle 310 to establish a concentration of atomized droplets within a specified portion 330 of the flow path(s) 104 at a specified time interval. Additionally, establishing the cleaning mist volume may also include establishing a cleaning mist flow rate within the flow path(s) 104. Establishing the cleaning mist flow rate may include establishing/modifying the velocity of the airflow 318. It should be appreciated that the velocity of the airflow 318 in conjunction with the number of nozzles 310 actuated may affect the resultant density of the cleaning mist 312 within the flow path(s) 104.

Referring still to FIG. 1, in an embodiment, the system 300 may also include in electronic sensor 328 (e.g., a humidity sensor, a lidar unit, an anemometer, and/or any other suitable sensor for detecting water/water vapor). The electronic sensor 328 may be communicatively coupled to the control unit 308 and may be positioned at the point-of-departure 136 from the assembled, on-wing, gas turbine engine 100. The electronic sensor 328 may monitor an absolute humidity level and/or quantity of liquid water droplets at the point-of-departure 136. The absolute humidity level/water droplet quantity may be utilized by the operator/controller 400 to determine a percentage of the delivered cleaning mist 312 remaining suspended at the point-of-departure 136 from the engine 100. For example, the absolute humidity level at the point-of-departure 136 may, when corrected for the ambient temperature, be indicative of the fluid content of the airflow 318 at the point-of-departure 136. The fluid content may, in turn, be indicative of a percentage of cleaning mist 312 introduced to the annular inlet 120 which remains suspended at the point-of-departure 136.

Utilizing the determined percentage of the cleaning mist 312 remaining suspended at the point-of-departure 136, the operator/controller 400 may, in an embodiment, adjust the cleaning mist volume delivered to the annular inlet 120 so as to achieve a desired level of wetting of the component(s) 102. For example, in an embodiment wherein the thermal state of the engine 100 is relatively high when the system 300 is activated, a significant percentage of the cleaning mist 312 may be converted to vapor in cooling the core engine 114. In such an embodiment, the absolute humidity level at the point-of-departure 136 may be relatively close to the ambient humidity level and may indicate a need to increase the cleaning mist volume to achieve the desired level of wetting of the component(s) 102. In a further embodiment, the absolute humidity level at the point-of-departure 136 may be significantly higher than the ambient humidity level, thus indicating an excessive amount of cleaning mist 312 remains suspended at the point-of-departure 136. In such an embodiment, the operator/controller 400 may reduce the cleaning mist volume and/or the velocity of airflow 318 so as to improve the efficiency of the system 300. Accordingly, in an embodiment, a cleaning cycle of the engine 100 may consume less than 57 liters of cleaning fluid 304.

In an embodiment, such as particularly depicted in FIGS. 2 and 3, the system 300 may be configured to determine a first volume of cleaning fluid 304 atomized and delivered as the cleaning mist 312 to the annular inlet. The first volume may, for example, be determined via the monitoring of a dispersal rate of the cleaning fluid 304 from the storage vessel 302. In an embodiment, the system 300 may also be configured to determine a second volume 332 of cleaning fluid 304 suspended at the point-of-departure 136 based on the retained total water level as may be indicated by the monitored absolute humidity level. Computing the difference between the first and second volumes may indicate the portion of the first volume of the cleaning fluid 304 precipitated/impacted onto the component(s) 102.

In an embodiment, the operator/controller 400 may adjust the cleaning mist volume delivered to the annular inlet 120 so that the second volume is less than or equal to 35% of the first volume. In other words, the system 300 may, in an embodiment, be configured to deliver the cleaning mist 312 at a cleaning mist volume and flowrate at which 65% or more of the cleaning mist 312 is deposited within the core engine 114. This may, for example, be desirable in an embodiment wherein the engine 100 is in a cold, thermally stable condition. However, for a hot engine 100, excess cleaning fluid 30 may be introduced to the engine 100 so as to accelerate the cooling and wetting of the surfaces of the component(s) 102. Accordingly, the second volume may exceed 35% of the first volume. It should be appreciated that ensuring that no more than 35% of the cleaning mist 312 passes completely through the core engine 114 once the core engine 114 is cooled may ensure that the system 300 is operating in an efficient manner. For example, the efficient manner may be defined by the execution of a cleaning cycle within 15 minutes which consumes less than 57 liters of cleaning fluid 304.

Referring again to FIG. 1, in an embodiment, the system 300 may include at least one blocking element 334 circumscribing the annular inlet 120. Additionally, in an embodiment, the blocking element(s) 334 may circumscribe the array of nozzles 320. The blocking element(s) 334 may at least partially occlude the alternative flow path(s) 148. It should be appreciated that occluding the alternative flow path(s) 148, may increase the efficiency of the system 300 by reducing or eliminating the portion of the cleaning mist 312 which may bypass the flow path(s) 104.

Figure 4:
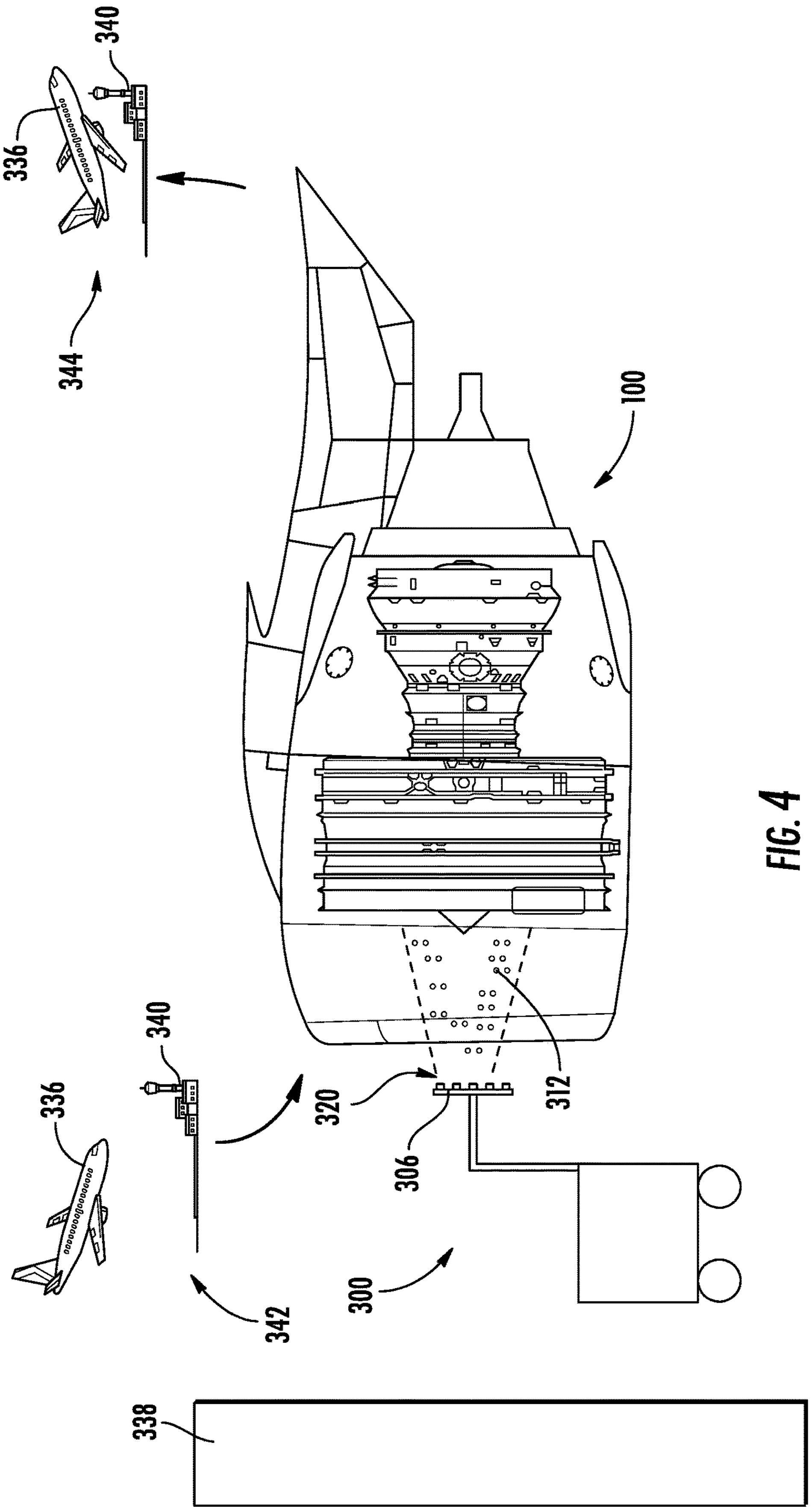
FIG. 4 shows a schematic view of an embodiment of a system for cleaning deposits according to the present disclosure.

Referring now to FIG. 4, in an embodiment, the system 300 may be configured for employment on the engine 100 while the aircraft 336 is parked at a gate 338 of an airport 340. Accordingly, the engine 100 may be cleaned utilizing the system 300 following a landing 342 or prior to a takeoff 344 without requiring that the aircraft 336 be moved to a maintenance area of the airport 340. It should be appreciated that performing the cleaning operations described herein while the aircraft 336 is located at the gate 338 may reduce or eliminate the amount of time the aircraft 336 is removed from service for engine cleaning operations.

In an embodiment, the system 300 may be configured to execute a cleaning cycle which has a duration of 30 minutes or less and a consumption of less than 120 liters. For example, the system 300 may be employed to dissolve a portion of the deposits on the component(s) 102 within 15 minutes of the cycle initiation with a consumption of less than 57 liters.

In an embodiment, Following the conclusion of the cleaning cycle, the delivery assembly 306 may be operably decoupled from the annular inlet 120. However, as the cleaning cycle disclosed herein does not require a rinse cycle, the component(s) 102 may remain in a wetted condition following the operable decoupling of the delivery assembly 306.

In an embodiment, the absence of a requirement to rinse the engine may be leveraged by supplying a surge portion of the cleaning mist 312 to the core engine 114 prior to operably decoupling the delivery assembly 306. In such an embodiment, a soak period may be established following the operable decoupling of the delivery assembly 306 during which the cleaning fluid 304 continues affecting the deposits on the component(s) 102. Accordingly, the surge portion may increase the wetness of the component(s) 102, thereby increasing the effectiveness of the soak period.

The ability to execute a cleaning cycle within 30 minutes or less while the aircraft 336 is parked at the gate 338 may facilitate an increased cleaning frequency relative to current engine cleaning approaches. As such, in an embodiment, the removing of the deposit from the component(s) 102 may be repeated at least once every 30 days and/or engine cycles. For example, in an embodiment, the system 300 may be employed at least once every 7 days to remove deposits from the component(s) 102. It should be appreciated that an engine cycle may correspond to a 24-hour period, a takeoff/landing sequence, and/or a specified quantity of engine operating hours.

In an embodiment, the data on the type and severity of contaminants encountered during the engine's operations may be utilized to modify the cleaning interval. For example, the type and/or severity of the contaminants encountered during the engine's operations may be high and may indicate that a reduced cleaning interval is be warranted. Such particulate conditions may, for example, be encountered when operating the engine 100 in dusty/desert environments and may justify removing the deposits from the component(s) 102 with the system 300 on a nightly basis.

It should be appreciated that frequent cleanings may preserve the efficiency and lifespan of the engine 100. It should also be appreciated that the more frequent cleanings may, individually, remove a smaller percentage of the deposits on the component(s) 102 relative to traditional water/foam washes. However, the effects of frequent cleanings may accumulate such that the combined effect of the frequent cleanings is cumulatively greater than any single water/foam wash. As a result, the shortened intervals between cleanings may result in the engine being operated in a less-fouled condition for a greater percentage of the time then is achievable under traditional approaches.

Figure 6:
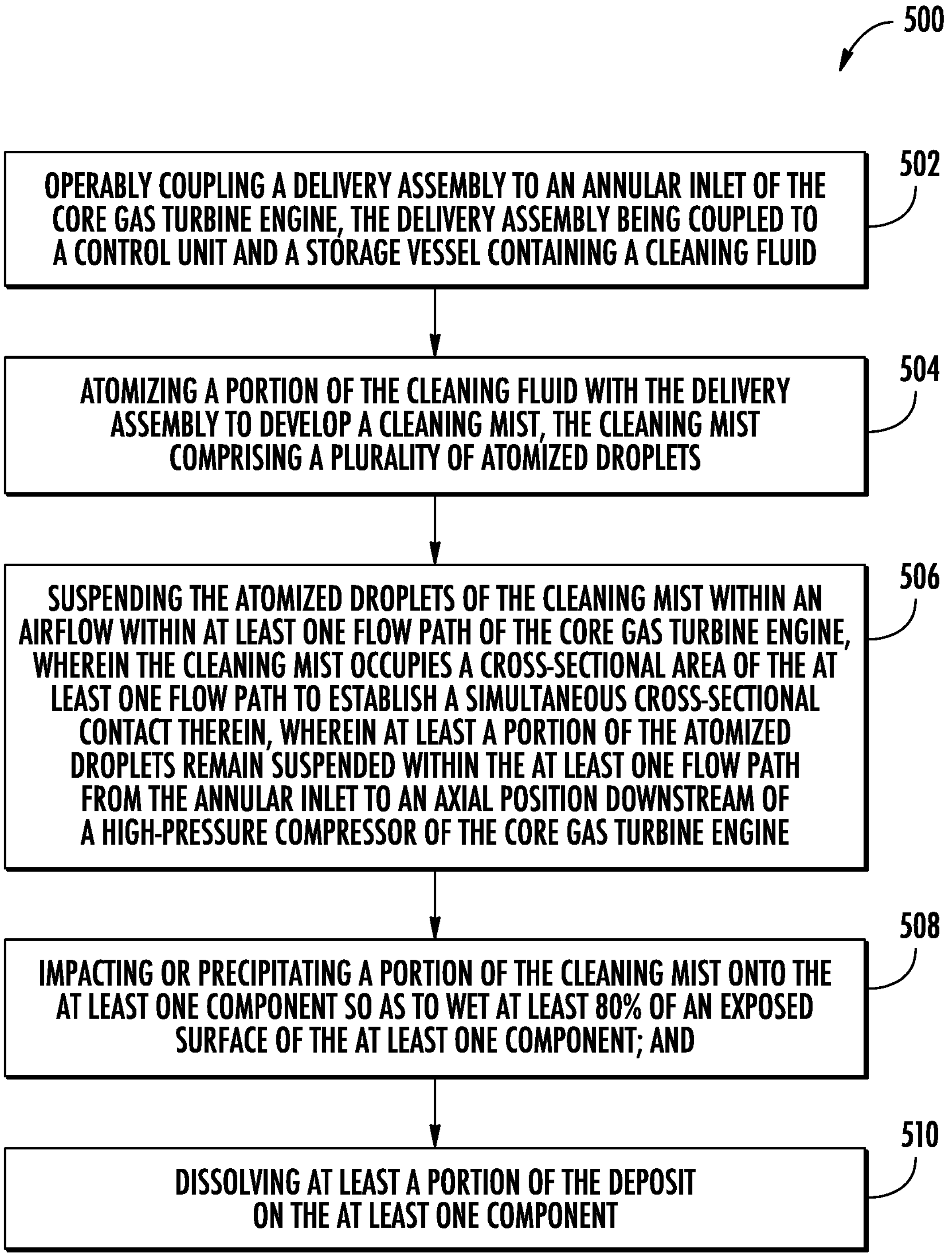
FIG. 6 illustrates a flow diagram of one embodiment of a method for removing a deposit from a component of the gas turbine engine of FIG. 1 according to the present disclosure.

Referring now to FIG. 6, a flow diagram of one embodiment of a method 504 removing a deposit from at least one component of an assembled, on-wing gas turbine engine is illustrated. The method 500 may be implemented using, for instance, the system 300 discussed above with references to FIGS. 1-4. FIG. 6 depicts steps performed in a particular order for purposes of illustration and discussion. Those of ordinary skill in the art, using the disclosures provided herein, will understand that various steps of the method 500, or any of the methods disclosed herein, may be adapted, modified, rearranged, performed simultaneously, or modified in various ways without deviating from the scope of the present disclosure.

As shown at (502), the method 500 may include operably coupling a delivery assembly to an annular inlet of the core gas turbine engine. The delivery assembly being coupled to a control unit and a storage vessel containing a cleaning fluid. As shown at (504), the method 500 may include atomizing a portion of the cleaning fluid with the delivery assembly to develop a cleaning mist. The cleaning mist may include a plurality of atomized droplets. Additionally, as shown at (506), the method 500 may include suspending the atomized droplets of the cleaning mist within an airflow within at least one flow path of the core gas turbine engine.

The cleaning mist may occupy a cross-sectional area of the at least one flow path to establish a simultaneous cross-sectional contact therein. At least a portion of the atomized droplets may remain suspended within the at least one flow path from the annular inlet to an axial position downstream of a compressor of the gas turbine engine. As shown at (508), the method 500 may include impacting or precipitating a portion of the cleaning mist onto the at least one component so as to wet at least 80% of an exposed surface of the at least one component. The method 500 may, at (510), further include dissolving at least a portion of the deposit on the at least one component.

Figure 5:
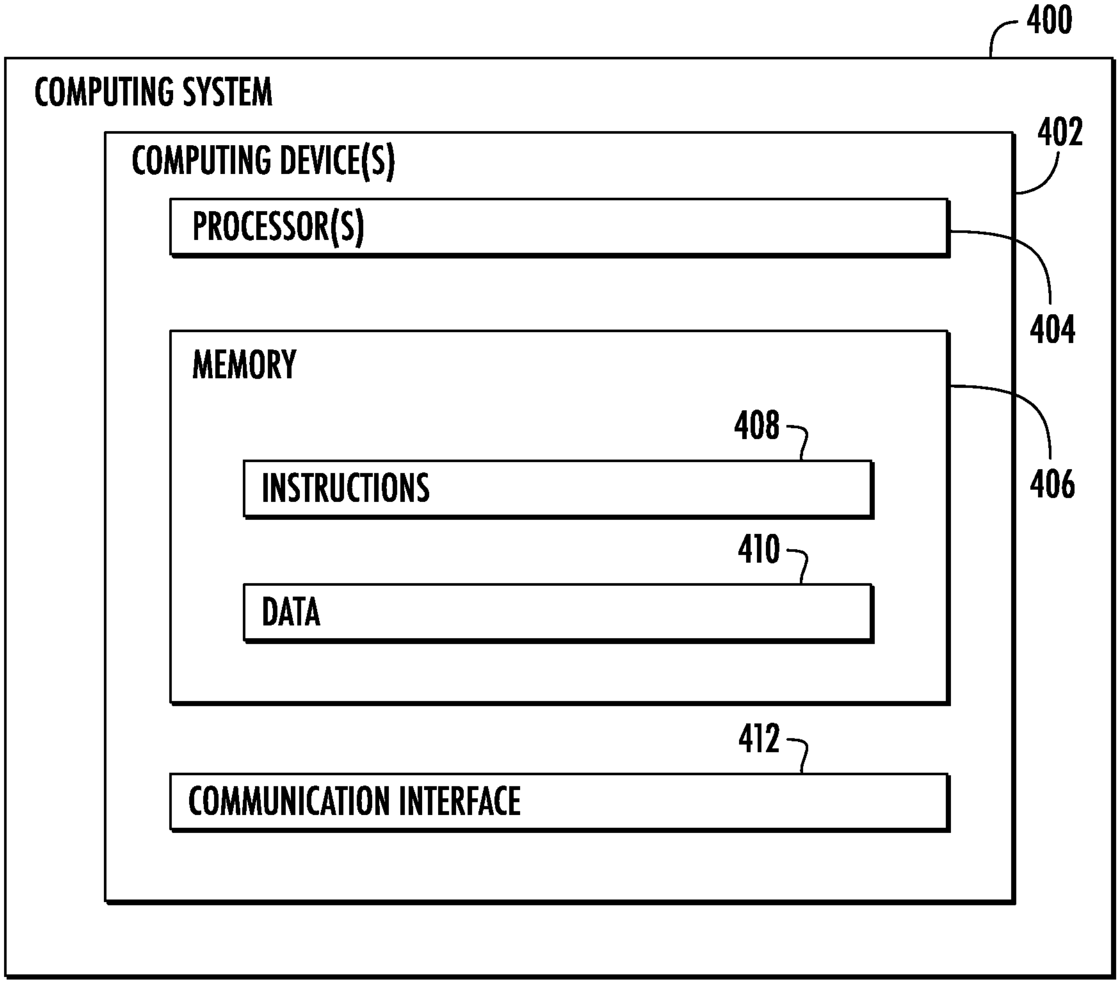
FIG. 5 depicts an exemplary controller such as for use in the exemplary systems of FIGS. 1-4.

FIG. 5 provides a block diagram of an exemplary controller 400 that may be used to implement the methods and systems described herein according to exemplary embodiments of the present disclosure. Though described below as a computing system, it should be appreciated that in some embodiments, the controller may be an analog system or an electrical system that does not include a computing device. As shown, the computing system 400 may include one or more computing device(s) 402. The one or more computing device(s) 402 may include one or more processor(s) 404 and one or more memory device(s) 406. The one or more processor(s) 404 may include any suitable processing device, such as a microprocessor, microcontroller, integrated circuit, logic device, or other suitable processing device. The one or more memory device(s) 406 may include one or more computer-readable media, including, but not limited to, non-transitory computer-readable media, RAM, ROM, hard drives, flash drives, or other memory devices.

The one or more memory device(s) 406 may store information accessible by the one or more processor(s) 404, including computer-readable instructions 408 that may be executed by the one or more processor(s) 404. The instructions 408 may be any set of instructions that when executed by the one or more processor(s) 404, cause the one or more processor(s) 404 to perform operations. The instructions 408 may be software written in any suitable programming language or may be implemented in hardware. In some embodiments, the instructions 408 may be executed by the one or more processor(s) 404 to cause the one or more processor(s) 404 to perform operations, such as implementing one or more of the processes mentioned above.

The memory device(s) 404 may further store data 410 that may be accessed by the processor(s) 404. For example, the data 410 may include a third instance of shared data for a gas turbine engine, as described herein. The data 410 may include one or more table(s), function(s), algorithm(s), model(s), equation(s), etc. according to example embodiments of the present disclosure.

The one or more computing device(s) 402 may also include a communication interface 412 used to communicate, for example, with the other component(s)s of system. The communication interface 412 may include any suitable component(s)s for interfacing with one or more network(s), including for example, transmitters, receivers, ports, controllers, antennas, or other suitable component(s)s.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among component(s)s. For instance, processes discussed herein may be implemented using a single computing device or multiple computing devices working in combination. Databases, memory, instructions, and applications may be implemented on a single system or distributed across multiple systems. Distributed component(s)s may operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for removing a deposit from at least one component of an assembled, on-wing gas turbine engine, the gas turbine engine comprising a core gas turbine engine positioned downstream of a fan section, the core gas turbine engine having an absence of power rotation during the removal of the deposit, the method comprising: operably coupling a delivery assembly to an annular inlet of the core gas turbine engine, the delivery assembly being coupled to a control unit and a storage vessel containing a cleaning fluid; atomizing a portion of the cleaning fluid with the delivery assembly to develop a cleaning mist, the cleaning mist comprising a plurality of atomized droplets; suspending the atomized droplets of the cleaning mist within an airflow within at least one flow path of the core gas turbine engine, wherein the cleaning mist occupies a cross-sectional area of the at least one flow path to establish a simultaneous cross-sectional contact therein, wherein at least a portion of the atomized droplets remain suspended within the at least one flow path from the annular inlet to an axial position downstream of a compressor of the core gas turbine engine; impacting or precipitating a portion of the cleaning mist onto the at least one component so as to wet at least 80% of an exposed surface of the at least one component; and dissolving at least a portion of the deposit on the at least one component.

Clause 2. The method of any preceding clause, wherein the atomized droplets have a median diameter of less than or equal to 50 microns and the cleaning mist has a fluid-to-air mass ratio of at least 0.05 and less than or equal to 5.0 kilograms of the cleaning fluid to kilograms of air.

Clause 3. The method of any preceding clause, wherein a thermal state of the core gas turbine engine is less than or equal to 135% of an ambient air temperature, and wherein the axial position downstream of the compressor is an axial position downstream of the on-wing gas turbine engine.

Clause 4. The method of any preceding clause, further comprising: establishing an elevated delivery temperature of the cleaning mist which increases the vapor content of the cleaning mist within the at least one flow path.

Clause 5. The method of any preceding clause, further comprising: supplying a surge portion of the cleaning mist to the core gas turbine engine; operably decoupling the delivery assembly from the annular inlet; and establishing a soak period during which the cleaning fluid affects the deposit.

Clause 6. The method of any preceding clause, wherein the delivery assembly comprises an array of nozzles, wherein each nozzle of the array of nozzles is configured to develop atomized droplets having a median diameter of less than or equal to 50 microns, the method further comprising: actuating at least one nozzle of the array of nozzles to establish a cleaning mist volume, wherein the cleaning mist volume comprises a concentration of atomized droplets within a specified portion of the at least one flow path, the cleaning mist volume being characterized by a fluid-to-air mass ratio of at least 0.05 and less than or equal to 5.0 kilograms of the cleaning fluid to kilograms of air.

Clause 7. The method of any preceding clause, further comprising: obtaining environmental data, the environmental data comprising an ambient temperature, an ambient pressure, and an ambient humidity affecting the on-wing gas turbine engine; obtaining data indicative of a thermal state of the core gas turbine engine; and based on the environmental data and the data indicative of the thermal state of the core gas turbine engine, establishing the cleaning mist volume delivered to the annular inlet, wherein establishing the cleaning mist volume further comprises establishing a cleaning mist flow rate within the at least one flow path.

Clause 8. The method of any preceding clause, wherein the environmental data further comprises data indicative of at least one of a type of suspended atmospheric particulate, an atmospheric particulate concentration, and an atmospheric particulate size for an operating environment of the on-wing gas turbine engine.

Clause 9. The method of any preceding clause, wherein further comprising: monitoring an absolute humidity level at a point-of-departure from the on-wing gas turbine engine; utilizing the monitored humidity level to determine a percentage of the delivered cleaning mist remaining suspended at the point-of-departure from the on-wing gas turbine engine; and adjusting the cleaning mist volume delivered to the annular inlet based on the determined percentage so as to achieve a desired level of wetting of the at least one component.

Clause 10. The method of any preceding clause, further comprising: determining a first volume of cleaning fluid atomized and delivered as the cleaning mist to the annular inlet; determining a second volume of cleaning fluid suspended at the point-of-departure from the on-wing gas turbine engine based on the monitored humidity level; computing the portion of the first volume of cleaning fluid precipitated onto the at least one component based on a difference between the first and second volumes; adjusting the cleaning mist volume delivered to the annular inlet so that the second volume is less than or equal to 35% of the first volume.

Clause 11. The method of any preceding clause, wherein the delivery assembly comprises an array of nozzles, and wherein operably coupling the delivery assembly to the annular inlet further comprises: positioning the array of nozzles within the fan section so that an outlet of each nozzle of the array of nozzles is arranged at an axial location between the fan section and the annular inlet of the core gas turbine engine; and circumscribing the array of nozzles with at least one blocking element, wherein the at least one blocking element at least partially occludes an alternative flow path.

Clause 12. The method of any preceding clause, further comprising: establishing a negative pressure differential between the annular inlet and a point-of-departure of the airflow from the on-wing gas turbine engine, wherein the negative pressure differential draws a portion of the cleaning mist through the core gas turbine engine.

Clause 13. The method of any preceding clause, wherein operably coupling the delivery assembly to the annular inlet of the core gas turbine engine further comprises operably coupling the delivery assembly to the annular inlet of the core gas turbine engine of an aircraft parked at a gate of an airport.

Clause 14. The method of any preceding clause, wherein removing the deposit from at least one component of the on-wing gas turbine engine is repeated at least once every 30 days.

Clause 15. The method of any preceding clause, further comprising: establishing a cleaning cycle, wherein the cleaning cycle has a duration of 30 minutes or less; and operably decoupling the delivery assembly from the annular inlet by a conclusion of the cleaning cycle.

Clause 16. The method of any preceding clause, wherein atomizing a portion of the cleaning fluid comprises atomizing less than 120 liters of cleaning fluid.

Clause 17. A system for cleaning deposits from at least one component of an assembled, on-wing gas turbine engine, the on-wing gas turbine engine comprising a core gas turbine engine positioned downstream of a fan section, the on-wing gas turbine engine having an absence of power rotation during the removal of the deposits, the system comprising: a storage vessel containing a cleaning fluid; a delivery assembly operably coupled the storage vessel and a control unit, the delivery assembly comprising at least one nozzle, the nozzle being configured to atomize a portion of the cleaning fluid to develop a cleaning mist comprising a plurality of atomized droplets, the atomized droplets having a median diameter facilitating suspension of the atomized droplets within at least one flow path of the core gas turbine engine from an annular inlet of the core gas turbine engine to an axial position downstream of a compressor of the core gas turbine engine, the cleaning mist occupying a cross-sectional area of the at least one flow path to establish a simultaneous cross-sectional contact therein; and a flow generation assembly, the flow generation assembly being oriented to facilitate a passage of the cleaning mist along the at least one flow path of the core gas turbine engine.

Clause 18. The system of any preceding clause, further comprising: a heating element positioned in thermal contact with the cleaning mist so as to establish an elevated delivery temperature of the cleaning mist which increases a vapor content of the cleaning mist.

Clause 19. The system of any preceding clause, further comprising a humidity sensor positioned at a point-of-departure from the gas turbine engine and communicatively coupled to the control unit, wherein the humidity sensor monitors a humidity level at the point-of-departure from the gas turbine engine, wherein the control unit utilizes the monitored humidity level to determine a percentage of the delivered cleaning mist remaining suspended at the point-of-departure from the on-wing gas turbine engine, and wherein the control unit adjusts a cleaning mist volume delivered to the annular inlet based on the determined percentage so as to achieve a desired level of wetting of the at least one component, wherein the atomized droplets have a median diameter of less than or equal to 50 microns and the cleaning mist volume is characterized by a fluid-to-air mass ratio of at least 0.05 and less than or equal to 5.0 kilograms of the cleaning fluid to kilograms of air.

Clause 20. The system of any preceding clause, wherein the nozzle is one of an array of nozzles, wherein the array of nozzles is arranged to interface with the fan section so as to position an outlet of each nozzle of the array of nozzles at an axial location between the fan section and the annular inlet of the core gas turbine engine, the system further comprising: at least one blocking element circumscribing the array of nozzles, wherein the at least one blocking element at least partially occludes an alternative flow path for the airflow.

What is claimed is:

1. A method for removing a deposit from at least one component of an assembled, on-wing gas turbine engine, the gas turbine engine comprising a core gas turbine engine positioned downstream of a fan section, the core gas turbine engine having an absence of powered rotation during the removal of the deposit, the method comprising:

operably coupling a delivery assembly to an annular inlet of the core gas turbine engine, the delivery assembly being coupled to a control unit and a storage vessel containing a cleaning fluid;

atomizing a portion of the cleaning fluid with the delivery assembly to develop a cleaning mist, the cleaning mist comprising a plurality of atomized droplets;

suspending the atomized droplets of the cleaning mist within an airflow within at least one flow path of the core gas turbine engine, wherein the cleaning mist occupies a cross-sectional area of the at least one flow path to establish a simultaneous cross-sectional contact therein, wherein at least a portion of the atomized droplets remain suspended within the at least one flow path from the annular inlet to an axial position downstream of a high-pressure compressor of the core gas turbine engine;

impacting or precipitating a portion of the cleaning mist onto the at least one component so as to wet at least 80% of an exposed, inlet-facing surface of the at least one component; and dissolving at least a portion of the deposit on the at least one component.

2. The method of claim 1, wherein the atomized droplets have a median diameter of less than or equal to 50 microns and the cleaning mist has a fluid-to-air mass ratio of at least 0.05 and less than or equal to 5.0 kilograms of cleaning fluid to kilograms of air.

3. The method of claim 1, wherein a thermal state of the core gas turbine engine is less than or equal to 135% of an ambient air temperature, and wherein the axial position downstream of the compressor is an axial position downstream of the on-wing gas turbine engine.

4. The method of claim 1, further comprising:

establishing an elevated delivery temperature of the cleaning mist which increases a vapor content of the cleaning mist within the at least one flow path.

5. The method of claim 1, further comprising:

supplying a surge portion of the cleaning mist to the core gas turbine engine;

operably decoupling the delivery assembly from the annular inlet; and establishing a soak period during which the cleaning fluid affects the deposit.

6. The method of claim 1, wherein the delivery assembly comprises an array of nozzles, wherein each nozzle of the array of nozzles is configured to develop atomized droplets having a median diameter of less than or equal to 50 microns, the method further comprising:

actuating at least one nozzle of the array of nozzles to establish a cleaning mist volume, wherein the cleaning mist volume comprises a concentration of atomized droplets within a specified portion of the at least one flow path, the cleaning mist volume being characterized by a fluid-to-air mass ratio of at least 0.05 and less than or equal to 5.0 kilograms of cleaning fluid to kilograms of air.

7. The method of claim 6, further comprising:

obtaining environmental data, the environmental data comprising an ambient temperature, an ambient pressure, and an ambient humidity affecting the on-wing gas turbine engine;

obtaining data indicative of a thermal state of the core gas turbine engine; and based on the environmental data and the data indicative of the thermal state of the core gas turbine engine, establishing the cleaning mist volume delivered to the annular inlet, wherein establishing the cleaning mist volume further comprises establishing a cleaning mist flow rate within the at least one flow path.

8. The method of claim 7, wherein the environmental data further comprises data indicative of at least one of a type of suspended atmospheric particulate, an atmospheric particulate concentration, and an atmospheric particulate size for an operating environment of the on-wing gas turbine engine.

9. The method of claim 7, wherein further comprising:

monitoring an absolute humidity level at a point-of-departure from the on-wing gas turbine engine;

utilizing the monitored absolute humidity level to determine a percentage of the delivered cleaning mist remaining suspended at the point-of-departure from the on-wing gas turbine engine; and adjusting the cleaning mist volume delivered to the annular inlet based on the determined percentage so as to achieve a desired level of wetting of the at least one component.

10. The method of claim 9, further comprising:

determining a first volume of cleaning fluid atomized and delivered as the cleaning mist to the annular inlet;

determining a second volume of cleaning fluid suspended at the point-of-departure from the on-wing gas turbine engine based on the monitored humidity level;

computing the portion of the first volume of cleaning fluid precipitated onto the at least one component based on a difference between the first and second volumes; and adjusting the cleaning mist volume delivered to the annular inlet so that the second volume is less than or equal to 35% of the first volume.

11. The method of claim 1, wherein the delivery assembly comprises an array of nozzles, and wherein operably coupling the delivery assembly to the annular inlet further comprises:

positioning the array of nozzles within the fan section so that an outlet of each nozzle of the array of nozzles is arranged at an axial location between the fan section and the annular inlet of the core gas turbine engine; and circumscribing the array of nozzles with at least one blocking element, wherein the at least one blocking element at least partially occludes an alternative flow path.

12. The method of claim 1, further comprising:

establishing a negative pressure differential between the annular inlet and a point-of-departure from the on-wing gas turbine engine, wherein the negative pressure differential draws a portion of the cleaning mist through the core gas turbine engine.

13. The method of claim 1, wherein operably coupling the delivery assembly to the annular inlet of the core gas turbine engine further comprises operably coupling the delivery assembly to the annular inlet of the core gas turbine engine of an aircraft parked at a gate of an airport.

14. The method of claim 1, wherein removing the deposit from at least one component of the on-wing gas turbine engine is repeated at least once every 30 days.

15. The method of claim 1, further comprising:

establishing a cleaning cycle, wherein the cleaning cycle has a duration of 30 minutes or less; and operably decoupling the delivery assembly from the annular inlet by a conclusion of the cleaning cycle.

16. The method of claim 1, wherein atomizing a portion of the cleaning fluid comprises atomizing less than 120 liters of cleaning fluid.

17. The method of claim 1, further comprising:

a heating element positioned in thermal contact with the cleaning mist so as to establish an elevated delivery temperature of the cleaning mist which increases a vapor content of the cleaning mist.

18. The method of claim 1, further comprising a humidity sensor positioned at a point-of-departure from the gas turbine engine and communicatively coupled to the control unit, wherein the humidity sensor monitors a humidity level at the point-of-departure from the gas turbine engine, wherein the control unit utilizes the monitored humidity level to determine a percentage of the delivered cleaning mist remaining suspended at the point-of-departure from the on-wing gas turbine engine, and wherein the control unit adjusts a cleaning mist volume delivered to the annular inlet based on the determined percentage so as to achieve a desired level of wetting of the at least one component, wherein the atomized droplets have a median diameter of less than or equal to 50 microns and the cleaning mist volume is characterized by a fluid-to-air mass ratio of at least 0.05 and less than or equal to 5.0 kilograms of the cleaning fluid to kilograms of air.

19. A method for removing a deposit from at least one component of an assembled, on-wing gas turbine engine, the gas turbine engine comprising a core gas turbine engine positioned downstream of a fan section, the core gas turbine engine having an absence of powered rotation during the removal of the deposit, the method comprising:

operably coupling a delivery assembly to an annular inlet of the core gas turbine engine, the delivery assembly being coupled to a control unit and a storage vessel containing a cleaning fluid;

atomizing a portion of the cleaning fluid with the delivery assembly to develop a cleaning mist, the cleaning mist comprising a plurality of atomized droplets;

suspending the atomized droplets of the cleaning mist within an airflow within at least one flow path of the core gas turbine engine, wherein the cleaning mist occupies a cross-sectional area of the at least one flow path to establish a simultaneous cross-sectional contact therein, wherein at least a portion of the atomized droplets remain suspended within the at least one flow path from the annular inlet to an axial position downstream of a high-pressure compressor of the core gas turbine engine;

impacting or precipitating a portion of the cleaning mist onto the at least one component so as to wet at least 80% of an exposed, inlet-facing surface of the at least one component; and debonding at least a portion of the deposit on the at least one component.

* * * * *